L. C. PARKER.
TOBACCO-SAFE.

No. 192,712. Patented July 3, 1877.

WITNESSES
INVENTOR.
ATTORNEYS.

UNITED STATES PATENT OFFICE.

LEWIS C. PARKER, OF ROBINSON, KANSAS.

IMPROVEMENT IN TOBACCO-SAFES.

Specification forming part of Letters Patent No. 192,712, dated July 3, 1877; application filed April 14, 1877.

*To all whom it may concern:*

Be it known that I, LEWIS C. PARKER, of Robinson, in the county of Brown and State of Kansas, have invented a new and valuable Improvement in Moisture-Retaining Safe; and I do hereby declare that the following is a full, clear, and exact description of the construction and operation of the same, reference being had to the annexed drawings, making a part of this specification, and to the letters and figures of reference marked thereon.

Figure 1:
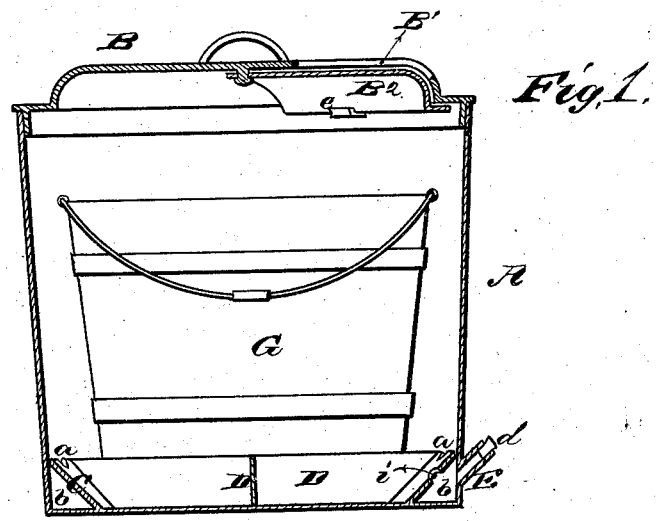
Figure 2:
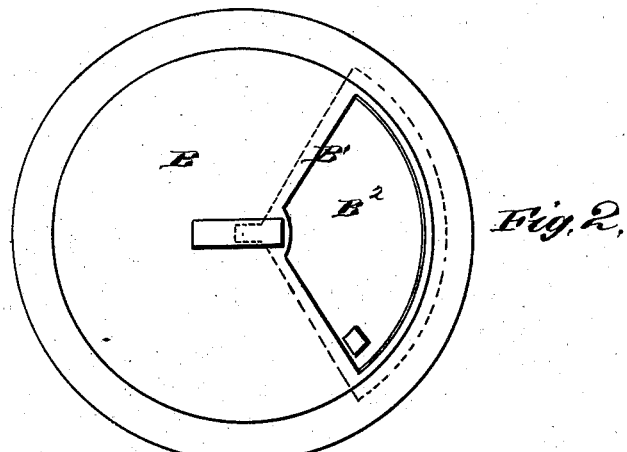
Figure 3:
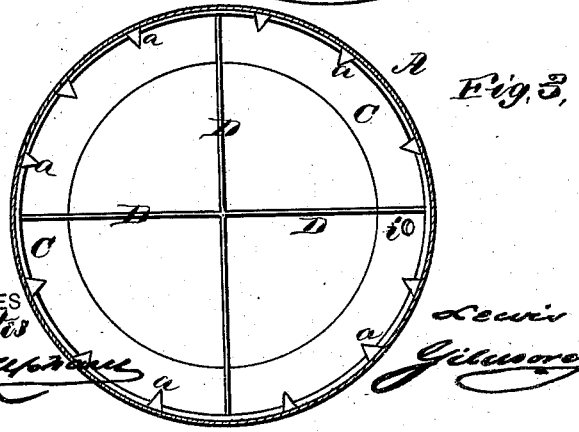

Figure 1 of the drawings is a representation of a vertical central section of my safe, and Fig. 2 is a top view of the same. Fig. 3 is a horizontal sectional view.

The nature of my invention consists in the construction and arrangement of a moisture-retaining safe for holding fine-cut tobacco or other articles, as will be hereinafter more fully set forth.

In the annexed drawing, A represents the shell or safe, made of any suitable dimensions, and provided with a cover, B. On the bottom of the safe A is placed a flaring rim, C, the lower edge of which is soldered to the bottom, and the upper edge to the sides of the safe, forming a chamber, $b$, at the bottom, around the sides of the safe. In the upper edges of the rim C are notches $a$, for the escape of the moisture from the water contained in the chamber $b$.

Within the rim C, on the bottom of the safe, are placed cross-bars D, upon which the pail G is supported, this pail containing the tobacco or other article for which the safe is intended. In the side of the safe A, at the top of the chamber $b$, is an inlet-tube, E, through which the water is admitted into the chamber, and directly opposite said inlet-tube, in the rim C, is an opening, $i$, which allows the water to pass within the rim and stand under the bottom of the pail G, the pail being, however, elevated above the water by the cross-bars or rack D.

The evaporation of the water will keep the articles in the pail continually moist, and, when necessary, more water can be easily supplied to the safe through the tube E, said tube being otherwise closed by stopper $d$.

In the cover B is made an opening, as at $B^1$, of suitable size, and in somewhat of a segmental form, and said opening is closed by means of a sliding lid, $B^2$, pivoted on the under side of the cover in the center, and held by suitable guides $e$ $e$. It is also provided with a knob or handle, by means of which it is easily turned to one side when access is desired to the pail G. Thus the cover B need not be removed from the safe except when the pail is to be removed or put in.

What I claim as new, and desire to secure by Letters Patent, is—

1. In a moisture-retaining safe, the combination, with the shell A, of the notched flaring rim C, having one or more openings, $i$, the cross-bars or rack D, and the elevated pail G, substantially as and for the purposes herein set forth.

2. The combination of the safe A, the cover B, with pivoted section $B^1$, the inlet E, rim C, rack D, and pail G, all constructed substantially as and for the purpose set forth.

In testimony that I claim the above I have hereunto subscribed my name in the presence of two witnesses.

LEWIS C. PARKER.

Witnesses:
WARREN SWIFT,
E. C. BROWN.